(12) United States Patent
Fukuhara et al.

(10) Patent No.: US 7,123,941 B2
(45) Date of Patent: Oct. 17, 2006

(54) RADIO LAN MASTER STATION SYSTEM

(75) Inventors: Tadayuki Fukuhara, Saitama (JP); Hiroyasu Ishikawa, Saitama (JP); Takayuki Warabino, Saitama (JP); Naoki Fuke, Saitama (JP); Keizo Sugiyama, Saitama (JP); Hideyuki Shinonaga, Saitama (JP)

(73) Assignee: KDDI R&D Laboratories Inc., Tokyo (JP)

( * ) Notice: Subject to any disclaimer, the term of this patent is extended or adjusted under 35 U.S.C. 154(b) by 451 days.

(21) Appl. No.: 10/083,508

(22) Filed: Feb. 27, 2002

(65) Prior Publication Data

US 2002/0128046 A1  Sep. 12, 2002

(30) Foreign Application Priority Data

Mar. 1, 2001  (JP) ............................. 2001/056750

(51) Int. Cl.
| | |
|---|---|
| H04M 1/00 | (2006.01) |
| H04B 7/14 | (2006.01) |
| H01Q 21/26 | (2006.01) |
| H01Q 3/00 | (2006.01) |
| H01Q 21/06 | (2006.01) |

(52) U.S. Cl. ...................... 455/562.1; 455/24; 455/25; 455/63.4; 343/797; 343/757; 343/753; 342/374; 342/361; 342/362

(58) Field of Classification Search ............ 455/562.1, 455/67.6, 24, 25, 500, 507, 63.4, 67.13; 342/361, 342/374, 362; 370/338; 343/797, 757, 753, 343/758, 751
See application file for complete search history.

(56) References Cited

U.S. PATENT DOCUMENTS

| | | | | | |
|---|---|---|---|---|---|
| 4,051,474 | A | * | 9/1977 | Mack et al. ................. | 342/362 |
| 4,801,940 | A | * | 1/1989 | Ma et al. ..................... | 342/359 |
| 5,375,140 | A | * | 12/1994 | Bustamante et al. ........ | 375/142 |
| 6,300,900 | B1 | * | 10/2001 | Bleret et al. ................. | 342/361 |
| 6,577,869 | B1 | * | 6/2003 | Garrison ..................... | 455/447 |
| 6,707,432 | B1 | * | 3/2004 | Strickland ................... | 343/761 |
| 2003/0162566 | A1 | * | 8/2003 | Shapira et al. .............. | 455/561 |
| 2004/0013211 | A1 | * | 1/2004 | Lindskog et al. ........... | 375/347 |
| 2004/0063433 | A1 | * | 4/2004 | Garrison ..................... | 455/447 |

FOREIGN PATENT DOCUMENTS

| | | |
|---|---|---|
| JP | 53-084619 | 7/1978 |
| JP | 04-082424 | 3/1992 |
| JP | 08-321799 | 12/1996 |
| JP | 11-127105 | 5/1999 |
| JP | 2000-224101 | 8/2000 |

* cited by examiner

Primary Examiner—George Eng
Assistant Examiner—Wesley Kim
(74) Attorney, Agent, or Firm—Armstrong, Kratz, Quintos, Hanson & Brooks, LLP

(57) ABSTRACT

A radio LAN master station system which provides long distance communication and suffers from small interference by another system located inside and/or outside of a service area comprises a transceiver, and a plurality of directional antennas each directed to a respective section with some angular spacing, through a power distributor which couples said transceiver with said antennas. Polarization plane of any antenna is orthogonal to polarization plane of an adjacent antenna.

3 Claims, 8 Drawing Sheets

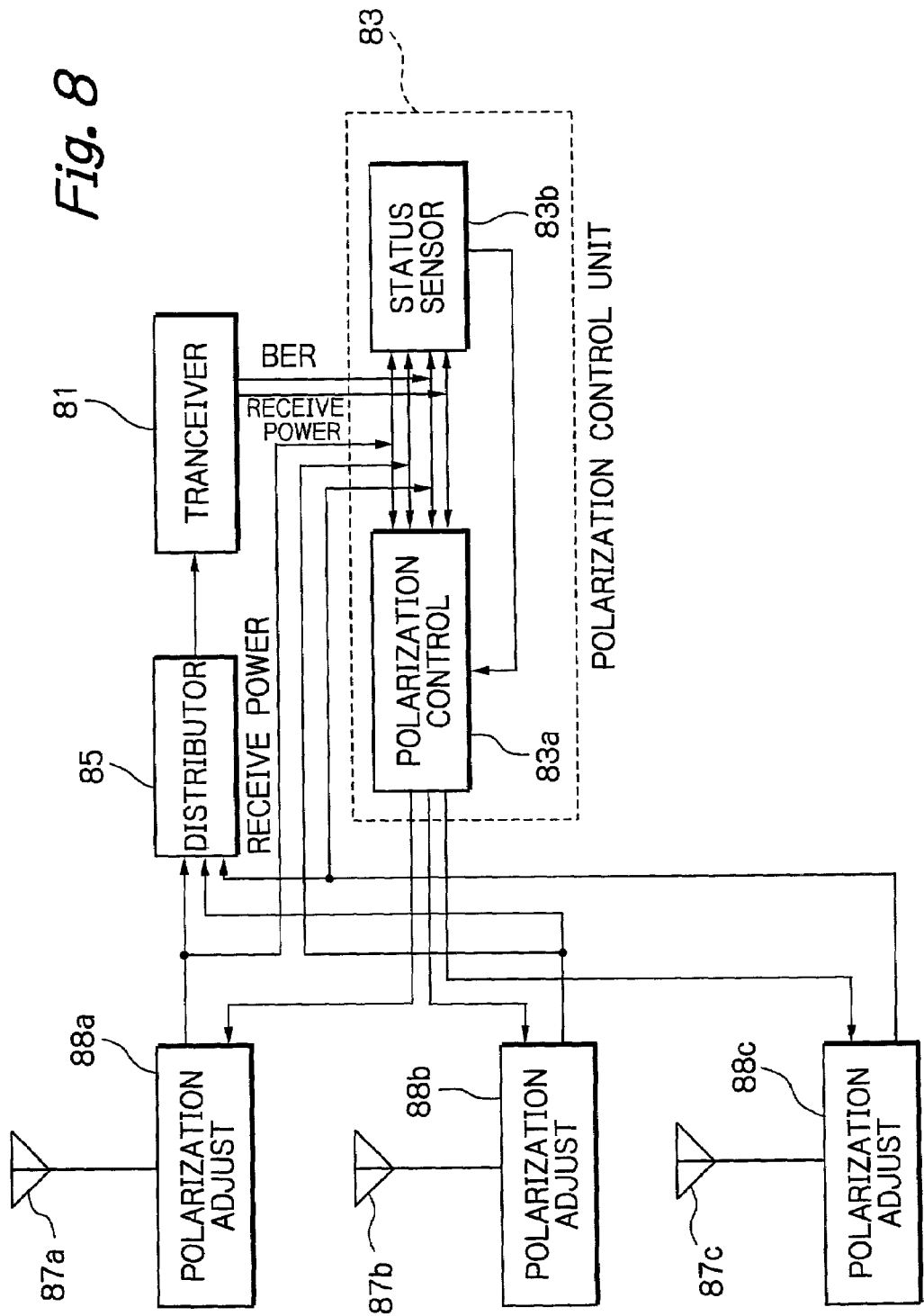

RADIO LAN MASTER STATION SYSTEM

BACKGROUND OF THE INVENTION

1. Field of the Invention

The present invention relates to a radio LAN (local area network) master station system, in particular, relates to such a system which has a specific antenna system.

2. Description of the Related Art

Lately, a radio LAN system in 2.4 GHz band has been utilized widely.

However, that frequency band, 2.4 GHz band, is also used for ISM (Industrial Science Medical) band. Therefore, a radio system which uses such frequency band is apt to be interfered by an ISM band system, such as a microwave oven. Nevertheless, a radio LAN system using 2.4 GHz band is popularized rapidly, since no license nor qualification is requested for the operation of that system, and no communication fee is charged by a communication company when the system is installed.

A radio LAN system is used not only indoors, but also out of a room in a communication manner such as a point—point manner, and/or a point-multipoints manner.

FIG. 1 shows a prior art radio LAN system in a point-multipoints manner, in which a single master station having a single wide angle antenna and a single transceiver, and a plurality of client terminals. A wide angle antenna is used in a radio LAN master station which operates in a point-multipoints manner out of a room, so that wide area can be covered by a single master station.

However, the radio LAN master station in FIG. 1 has a disadvantage that it suffers from interference by a similar LAN system closely located, and/or by another system using the same frequency band. Further, communication quality is much degraded because of multi-path propagation. In FIG. 1, radio wave emitted by a client terminal 1-3-1 is received by a master station 1-1-1 through an antenna 1-1-2 not only as direct wave 1-2-1, but also as reflection wave 1-2-2 which reaches the antenna 1-1-2 through reflection by a building 1-2-3 which locates close to a direct path between a master station and a client terminal. A reflected wave is an undesired interference wave in a master station.

The radio LAN master station system in FIG. 1 having a single wide angle antenna has further disadvantage that no long communication is possible because a wide angle antenna has small gain.

SUMMARY OF THE INVENTION

It is an object of the present invention, therefore, to overcome the disadvantages and limitations of a prior radio LAN master station system.

It is also an object of the present invention to provide a radio LAN master station system which is free from interference, and can have long distance communication.

The above and other objects are attained by a radio LAN master station system comprising; a transceiver, a plurality of directional antennas directed to each specific directions, a power distributor coupling said antennas with said transceiver.

Preferably, a polarization plane of any antenna is orthogonal to a polarization plane of an adjacent antenna.

Preferably, the angle of polarization plane of an antenna from vertical plane or a horizontal plane is determined by the steps of selecting one of the antennas having the largest interference, rotating the angle of polarization plane of the selected antenna to determine the angle of polarization plane called a reference angle so that interference becomes the minimum, determining the angle of polarization plane of other antennas based upon said reference angle so that the angle of polarization plane of any antenna is orthogonal to angle of polarization plane of an adjacent antenna.

Preferably, angle of polarization plane of an antenna from vertical plane or horizontal plane is determined by the steps of; selecting one of the antennas having the largest interference, selecting one of vertical polarization plane and horizontal polarization plane of said selected antenna, as a reference polarization plane, determining an angle of polarization plane of other antennas based upon said reference polarization plane so that polarization plane of any antenna is orthogonal to an adjacent antenna.

Preferably, angle of polarization plane from vertical plane or horizontal plane of an antenna by the first steps comprising the steps of; selecting one of the antennas having the largest interference, selecting one of vertical polarization plane and horizontal polarization plane of said selected antenna, as a reference polarization plane, determining the angle of polarization plane of other antennas based upon said reference polarization plane so that polarization plane of any antenna is orthogonal to an adjacent antenna; the second steps comprising the steps of; selecting one of the antennas having the largest interference larger than a predetermined threshold, and reversing the polarization plane of said selected antenna from vertical polarization to horizontal polarization, or from horizontal polarization to vertical polarization; and third steps repeating said each steps of said second step until interference of all the antennas is smaller said predetermined threshold.

Preferably, the angle of polarization plane of an antenna from vertical plane or horizontal plane is determined by the steps of; selecting one of horizontal polarization and vertical polarization of each antenna, so that interference of said antenna is the smaller.

Preferably, the angle of polarization plane of an antenna from vertical plane or horizontal plane is determined by the steps of: rotating polarization plane of each antenna so that interference in said antenna is a minimum, determining an angle of polarization plane which provides said minimum interference.

Preferably, an angle of polarization plane from vertical plane or horizontal plane in a radio LAN master station system is determined by the steps of; (a) the antennas being classified into groups each having a plurality of antennas, so that interference between adjacent groups is small; (b) determining the polarization plane of a first antenna in a first group; (c) determining the polarization plane of a second antenna in a first group, said second antenna locating adjacent to said first antenna, so that the polarization plane of said second antenna is orthogonal to the polarization plane of said first antenna; (d) repeating said step (c) for other antennas; and (e) repeating said steps (b) and (c) for the antennas in other groups.

BRIEF DESCRIPTION OF THE DRAWINGS

The foregoing and other objects, features, and attendant advantages of the present invention will be better understood by means of the following description and drawings wherein;

FIG. 8 is a block diagram of a master station according to the present invention.

DESCRIPTION OF THE PREFERRED EMBODIMENTS

Figure 1:
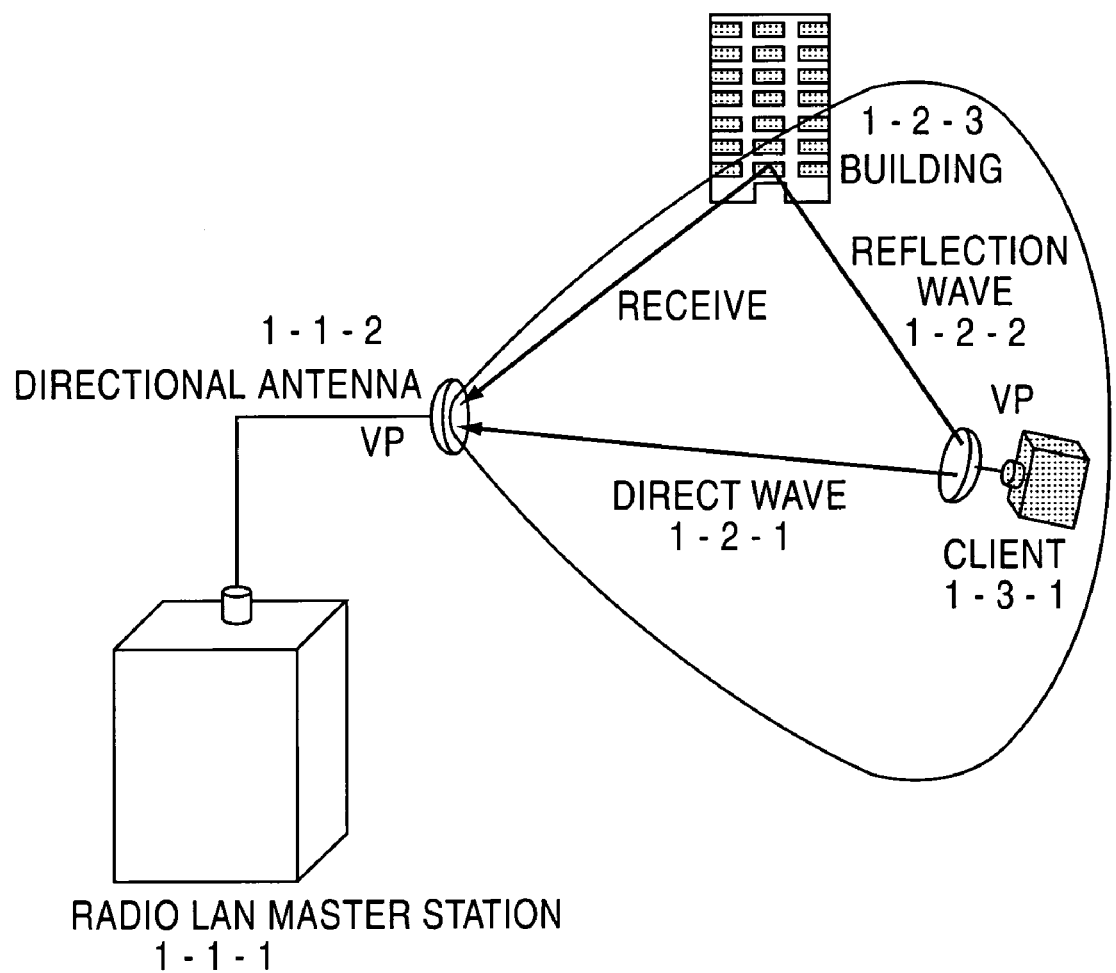
FIG. 1 is a prior point-multipoints radio LAN system having a master station having a single wide angle antenna and a single transceiver.
Figure 2:
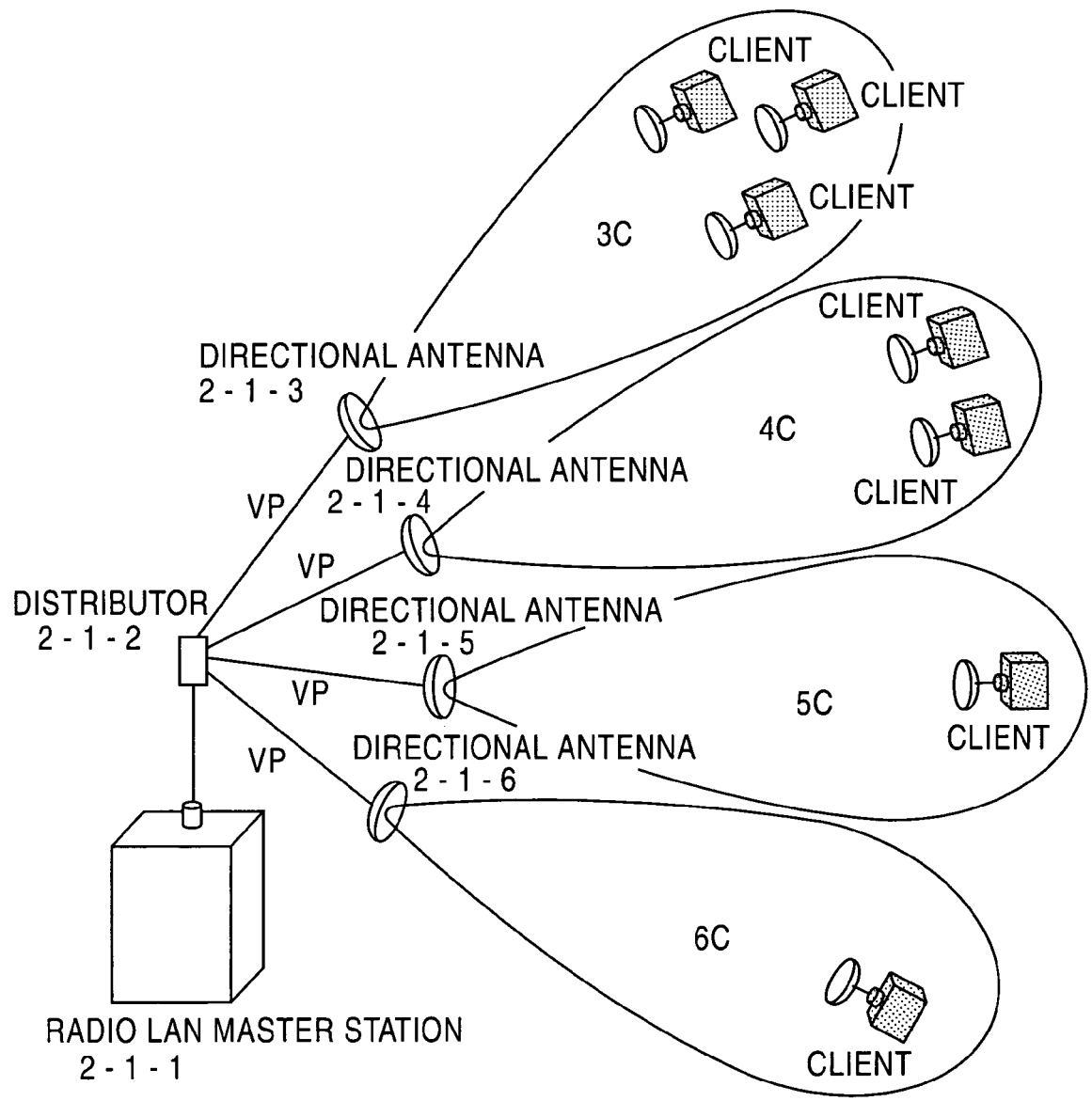
FIG. 2 is a first embodiment of a radio LAN master station system according to the present invention.

FIG. 2 shows the arrangement of a first embodiment of a radio LAN master station according to the present invention. A master station 2-1-1 is coupled with a plurality of directional antennas 2-1-3, 2-1-4, 2-1-5 and 2-1-6 through a power distributor 2-1-2, so that radio cells 3c–6c are provided, relating to each of the directional antennas. Each of the antennas 2-1-3 through 2-1-6 are directed to a specific cell, and a client terminal is located in each cell. In one embodiment, a radiowave emitted by each of the antennas has the common polarization, for instance, vertical polarization. The arrangement of FIG. 2 has an advantage that a long distance communication is possible, because the service area is divided into a plurality of cells and an antenna is a directional antenna illuminating only a small cell and having large gain, although the arrangement of FIG. 1 does not have such an advantage. Further, the arrangement of FIG. 2 has an advantage that undesired interference is decreased, since no beam is directed to unnecessary area. Further, as a master station is comprised of a single transceiver and a plurality of antennas, the cost of the same is low.

Figure 3:
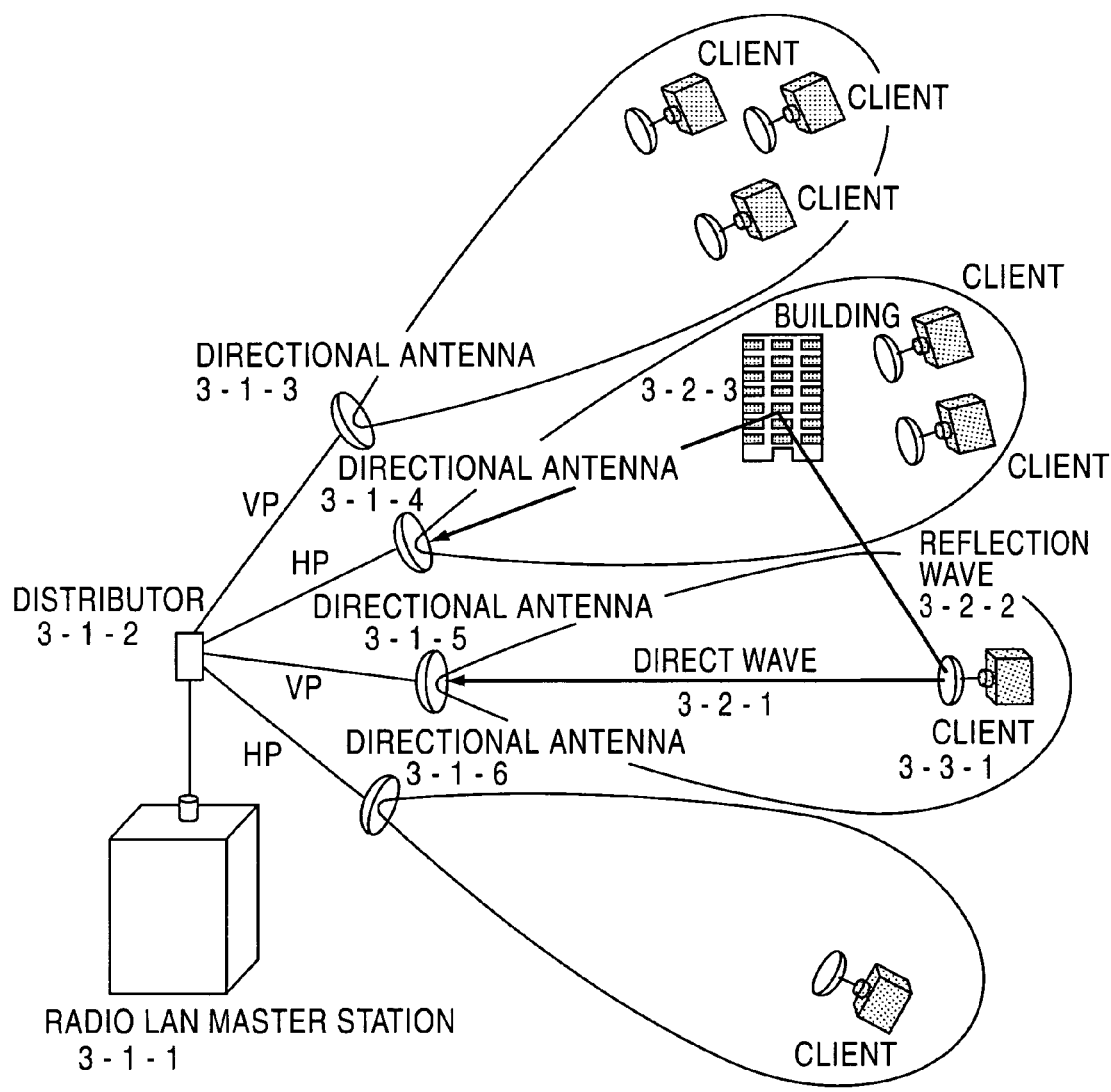
FIG. 3 is a second embodiment of a radio LAN master station system according to the present invention.

FIG. 3 shows the arrangement of a second embodiment of a radio LAN master station according to the present invention. The arrangement of FIG. 3 has an advantage that a multi-path wave emitted by a client terminal 3-3-1 directed to one of the directional antennas but reflected by an undesirable reflection body such as a building 3-2-3, provides less interference to an adjacent antenna. A master station 3-1-1 is coupled with a plurality of directional antennas 3-1-3, 3-1-4, 3-1-5 and 3-1-6 through a power distributor 3-1-2. The arrangement of FIG. 3 is a modification of FIG. 2, and antennas in FIG. 3 use vertical polarization and horizontal polarization alternately in angular direction, so that antennas 3-1-3 and 3-1-5 use vertical polarization, and antennas 3-1-4 and 3-1-6 use horizontal polarization. A radio wave 3-2-1 emitted by a client terminal 3-3-1 in a vertical polarization is received by an antenna 3-1-5 as a direct wave, and said radio wave is further reflected by a building 3-2-3 as a reflection wave 3-2-2, and is received by another antenna 3-1-4 which is located close to said antenna 3-1-5, and is designed to receive horizontal polarization. The reflection wave 3-2-2 received by the antenna 3-1-4 has low sensitivity, because of the difference of polarization between the antennas 3-1-4 and 3-1-5. Thus, the influence by multi-path wave is decreased while a single transceiver is used.

Figure 4:
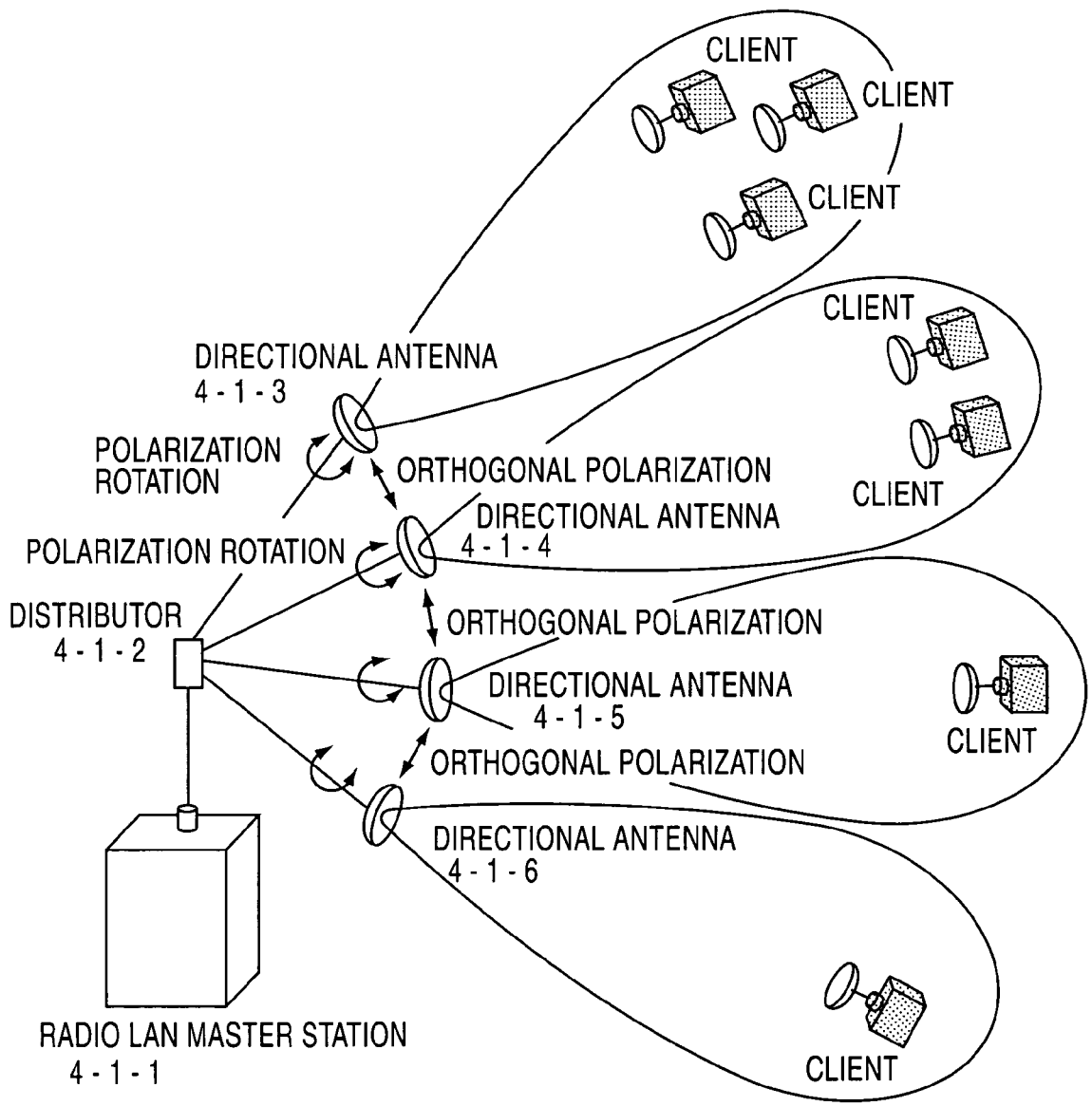
FIG. 4 is a third embodiment of a radio LAN master station system according to the present invention.

FIG. 4 shows the arrangement of a third embodiment of a radio LAN master station according to the present invention. The embodiment of FIG. 4 is the modification of FIG. 3, and intends to remove interference by other systems which can not remove by simple alternate arrangement of polarization as shown in FIG. 3. A master station 4-1-1 is coupled to a plurality of directional antennas 4-1-3, 4-1-4, 4-1-5 and 4-1-6 through power distributor 4-1-2. The embodiment of FIG. 4 has the feature that antennas 4-1-3, 4-1-4, 4-1-5 and 4-1-6 are not a strict vertical antenna, nor a strict horizontal antenna, but polarization plane of each antenna is rotated from vertical plane or horizontal plane, so that two adjacent antennas have polarizations in orthogonal relations with each other. The resultant polarization plane is fixed when the interference becomes the minimum.

The polarization plane which provides the minimum interference is determined as follows. First, the antenna which has the largest interference among all the antennas is selected. Assuming that the antenna 4-1-5 has the largest interference, the polarization plane of said antenna 4-1-5 is rotated so that the interference of said antenna 4-1-5 becomes the minimum to determine the angle of the polarization plane from the vertical plane or the horizontal plane. The polarization angle which provides the minimum interference in the first antenna is called reference angle. Next, the angle of the polarization plane of other antennas is determined so that two adjacent antennas have polarizations in orthogonal relations with each other. Thus, for instance, the polarization planes of the antennas 4-1-4 and 4-1-6 are rotated so that those planes are orthogonal to the polarization plane of the antenna 4-1-5, and then, the polarization plane of the antenna 4-1-3 is rotated so that it is orthogonal to the polarization plane of the antenna 4-1-4. The polarization plane of other antennas is determined similarly.

Thus, all the antennas in the current embodiment provide minimum interference.

Figure 5:
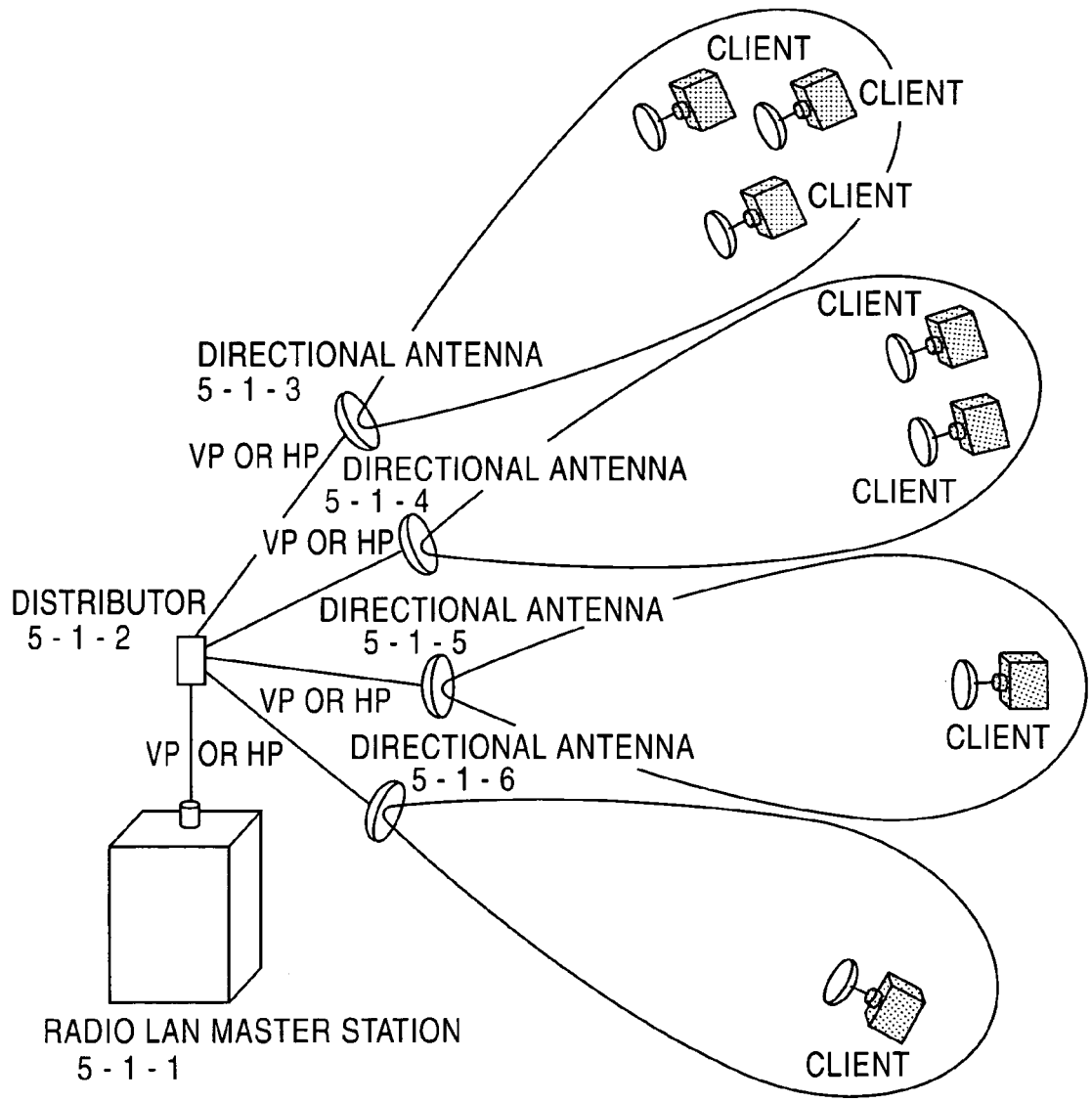
FIG. 5 is a fourth embodiment of a radio LAN master station system according to the present invention.

FIG. 5 is another modification of a radio LAN master station system of FIG. 3 according to the present invention, and has the advantage to remove interference which can not be removed by the simple alternate arrangement of vertical polarization and horizontal polarization in FIG. 3.

The master station 4-1-1 is coupled to a plurality of directional antennas 5-1-3, 5-1-4, 5-1-5 and 5-1-6 through power distributor 5-1-2.

First, the antenna which has the largest interference is selected among all the antennas. Assuming that the antenna 5-1-5 has the largest interference, one of the vertical polarization and horizontal polarization of the selected antenna 5-1-5 is selected. Assuming that the vertical polarization is selected, that polarization of the antenna 5-1-5 is called reference polarization. Then, the polarization plane of other antennas is determined so that two adjacent antennas have the orthogonal relations in polarization planes with each other, based upon said reference polarization. For instance, the antennas 5-1-4 and 5-1-6 have a horizontal polarization plane which is orthogonal to the reference polarization of the antenna 5-1-5. Then, the polarization plane of the antenna 5-1-3 is a vertical polarization, which is orthogonal to the horizontal polarization of the antenna 5-1-4. Similarly, the polarization plane of all the antennas is determined, and an interference of all the antennas becomes the minimum.

Next, the antenna which has the largest interference among all the antennas, and said largest interference is larger than the allowable level, is selected. Assuming that the antenna 5-1-3 is selected, the polarization plane of the antenna 5-1-3 is reversed, that is to say, it is switched from vertical polarization to horizontal polarization. By repeating the above process, the whole antenna system can have the interference which is lower than the predetermined threshold.

As a modification, an antenna is switched one by one between a horizontal polarization and a vertical polarization so that an interference of the antenna is the lower. Thus, the switching of a horizontal polarization and a vertical polarization of the antennas 5-1-3, 5-1-4, 5-1-5 and 5-1-6 is repeated by 24 (=16) times, and polarization of each antenna is finally determined when the interference is the minimum.

Figure 6:
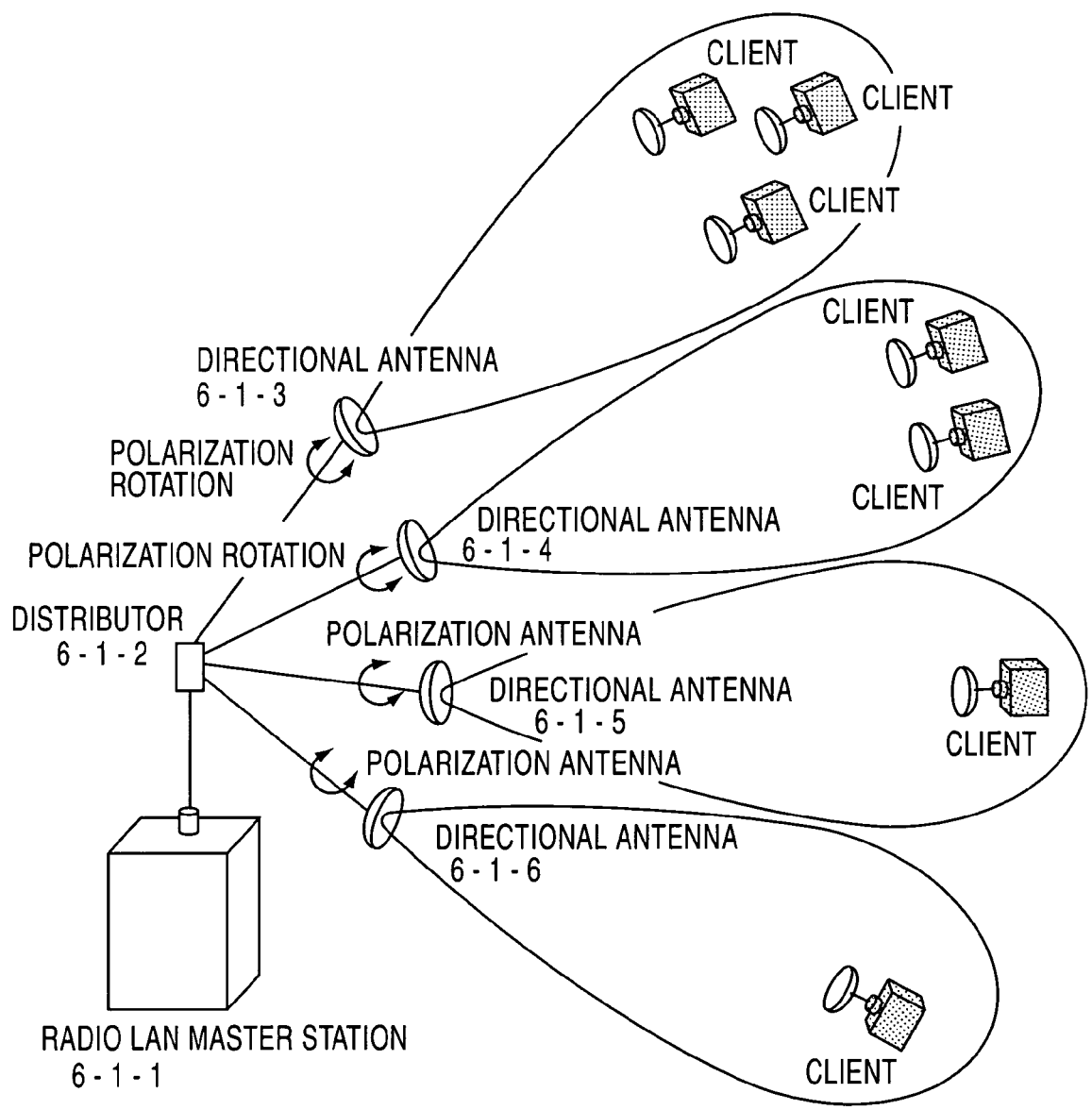
FIG. 6 is a fifth embodiment of a radio LAN master station system according to the present invention.

FIG. 6 is still another modification of the present invention. The master station 6-1-1 is coupled to a plurality of directional antennas 6-1-3, 6-1-4, 6-1-5 and 6-1-6 through power distributor 6-1-2. In this embodiment, each antenna 6-1-3, 6-1-4, 6-1-5 and 6-1-6 rotates a polarization plane of the antenna so that an interference of the antenna is the minimum.

Figure 7:
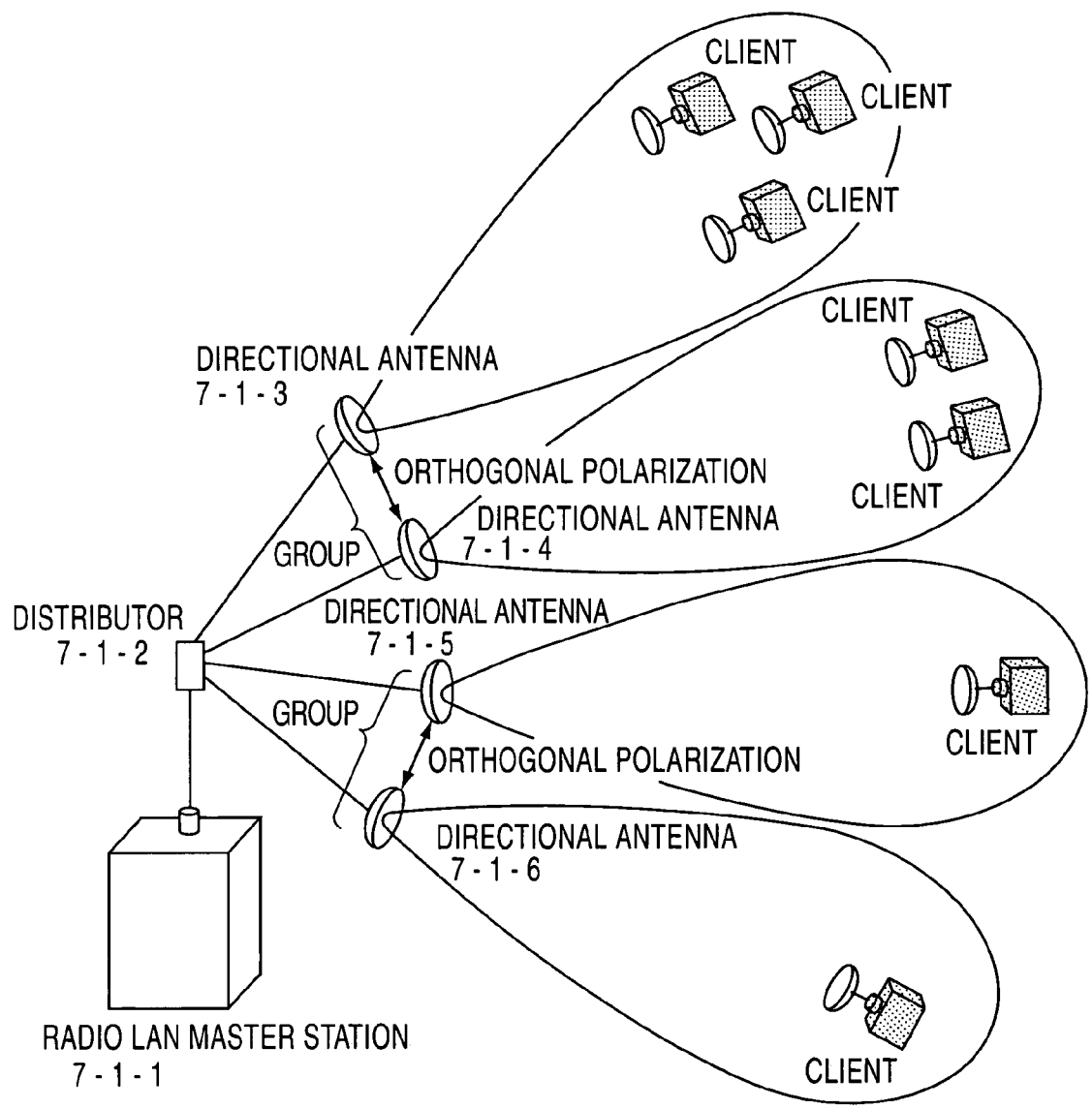
FIG. 7 is a sixth embodiment of a radio LAN master station system according to the present invention.

FIG. 7 is still another modification of the present invention, and is the combination of the previous embodiments. The master station 7-1-1 is coupled to a plurality of directional antennas 7-1-3, 7-1-4, 7-1-5 and 7-1-6 through distributor 7-1-2. When there is hardly interference by multi-path propagation between the antenna 7-1-4 and 7-1-5, the antennas 7-1-3 and 7-1-4 are grouped, so that the antenna 7-1-3 is a vertical polarization antenna, and the antenna 7-1-4 is a horizontal polarization antenna. And, the antennas 7-1-5 and 7-1-6 are grouped so that the antenna 7-1-5 is a vertical polarization antenna and the antenna 7-1-6 is a horizontal polarization antenna. Thus, interference by other systems located in adjacent areas is reduced.

FIG. 8 is a block diagram of a master station.

In FIG. 8, each antenna 87*a*, 87*b*, 87*c* . . . is associated with a polarization adjust 88*a*, 88*b*, 88*c* . . . , respectively. A polarization adjust adjusts polarization angle of radio wave radiated by an antenna under the control by a polarization control unit 83. An output or an input of each antenna 87*a*, 87*b*, 87*c* . . . is applied to a distributor 85, which combines an output of each antenna, or distributes signal from a transceiver 81 to each antenna. An output of each antenna is, further, applied to a polarization control unit 83. A transceiver 81 measures receive power of antennas, and BER (bit error rate) of receive signal by each antenna. Receive power measured by the transceiver 81 is the total receive power of all the antennas combined by the distributor 85, while receive power measured by each antenna and applied to the polarization control unit 83 is the individual receive power of each specific antenna.

In the polarization control unit 83, a status sensor 83*b* measures whether each channel associated with each antenna is under communication or silent, according to receive power or BER supplied by the transceiver 81, or both. A polarization control 83*a* adjust polarization angle of each antenna by sending a polarization adjust a control signal. When a client terminal associated with a specific antenna is silent, the polarization control 83*a* controls a polarization adjust so that receive power received by a related antenna becomes the minimum. On the other hand, when a client terminal associated with a specific antenna is under communication and is radiating radio wave, the polarization control 83*a* controls a polarization adjust so that a value BER of the related client terminal becomes the minimum, or receive power measured by the transceiver 81 becomes the maximum.

In a modification, the polarization control 83*a* controls a polarization adjust in silent status so that receive power measured by the transceiver 81 becomes the maximum. In this modification, it is not necessary that the receive power of each antenna is applied to a polarization control unit 83.

In an initialization step of each antenna, a pair of adjacent antennas are first adjusted so that polarizations of those antennas are orthogonal, and next, polarization of a first antenna is adjusted so that receive power by said antenna in silent status becomes the minimum. Naturally, polarization of a second antenna is adjusted again so that polarization of the second antenna is orthogonal with that of the first antenna. The polarization angle of a master station must be informed a client terminal so that the antenna of the client terminal is adjusted to the same polarization angle of that of the master station.

When no interference by another system is received, but only interference by multi-path propagation is received, a polarization of each antenna except an antenna which receives the maximum power may be adjusted so that receive power by said antenna becomes a minimum.

In one modification, interference is measured during silent status periodically, and polarization angle is adjusted so that receive power by the interference becomes the minimum, and the polarization angle thus adjusted is informed to a client terminal, which adjusts polarization angle of the own terminal, so that receive power by interference becomes the minimum.

When the present invention is applied to 2.4 GHz radio LAN system, in which no operation license and no qualification is necessary, a point-to-multi-points communication which provides not only long distance communication but also interference free communication from another system located out of a service area, is obtained with low cost.

Further, an interference between adjacent antennas is reduced, and an interference from another system is reduced.

From the foregoing, it will now be apparent that a new and improved radio LAN master station system has been found. It should be understood of course that the embodiments disclosed are merely illustrative and are not intended to limit the scope of the invention. Reference should be made to the appended claims, therefore, to indicate the scope of the invention.

What is claimed is:

1. A process for determining an angle of polarization plane from a vertical plane or a horizontal plane in a radio LAN master station including a transceiver, a plurality of directional antennas directed to each of specific directions, and a power distributor coupling said antennas with said transceiver, the process comprising the steps of:
   selecting one of the antennas having the largest interference;
   rotating an angle of polarization plane of the selected antenna to determine an angle of polarization plane called a reference angle so that interference becomes a minimum; and
   determining an angle of polarization plane of each of the other antennas based upon said reference angle so that an angle of polarization plane of any said antenna is orthogonal to an angle of polarization plane of an adjacent antenna.

2. A process for determining an angle of polarization plane from a vertical plane or a horizontal plane in a radio LAN master station system including a transceiver, a plurality of directional antennas directed to each of specific directions, and a power distributor coupling said antennas with said transceiver, the process comprising the steps of:
   selecting one of the antennas having the largest interference;
   selecting one of a vertical polarization plane and a horizontal polarization plane of said selected antenna, as a reference polarization plane; and
   determining an angle of polarization plane of other antennas based upon said reference polarization plane so that a polarization plane of any antenna is orthogonal to an adjacent antenna.

3. A process for determining an angle of polarization plane from a vertical plane or a horizontal plane in a radio LAN master station system including a transceiver, a plurality of directional antennas directed to each of specific directions, and a power distributor coupling said antennas with said transceiver, the process comprising the steps of:

first steps comprising the steps of;

selecting one of the antennas having the largest interference;

selecting one of a vertical polarization plane and a horizontal polarization plane of said selected antenna, as a reference polarization plane;

determining the angle of polarization plane of other antennas based upon said reference polarization plane so that a polarization plane of any antenna is orthogonal to an adjacent antenna;

second steps comprising the steps of;

selecting one of the antennas having the largest interference greater than a predetermined threshold; and reversing the polarization plane of said selected antenna from vertical polarization to horizontal polarization, or from horizontal polarization to vertical polarization; and third steps repeating each of the steps of said second steps until interference of all the antennas becomes less than said predetermined threshold.

\* \* \* \* \*

UNITED STATES PATENT AND TRADEMARK OFFICE
CERTIFICATE OF CORRECTION

| | |
|---|---|
| PATENT NO. | : 7,123,941 B2 |
| APPLICATION NO. | : 10/083508 |
| DATED | : October 17, 2006 |
| INVENTOR(S) | : Fukuhara et al. |

It is certified that error appears in the above-identified patent and that said Letters Patent is hereby corrected as shown below:

On the Title Page;
change item (73), "KDDI R&D Laboratories Inc., Tokyo (JP)" to be -- KDDI Corporation, Tokyo (JP) --

Signed and Sealed this

Twenty-ninth Day of May, 2007

JON W. DUDAS
*Director of the United States Patent and Trademark Office*